June 19, 1956  B. A. BUSS  2,750,777
AUTOMATIC CONTROLS FOR COMMERCIAL WASHERS
Filed May 11, 1951  2 Sheets-Sheet 1

*INVENTOR.*
B. ALVIN BUSS
BY
ATTORNEY

June 19, 1956      B. A. BUSS      2,750,777
AUTOMATIC CONTROLS FOR COMMERCIAL WASHERS
Filed May 11, 1951      2 Sheets-Sheet 2

INVENTOR.
B. ALVIN BUSS
BY
Bruno Gechler
ATTORNEY

United States Patent Office 2,750,777
Patented June 19, 1956

2,750,777

AUTOMATIC CONTROLS FOR COMMERCIAL WASHERS

Benjamin Alvin Buss, East Moline, Ill., assignor to American Machine and Metals, Inc., Moline, Ill., a corporation of Delaware Application May 11, 1951, Serial No. 225,890

13 Claims. (Cl. 68—12)

This invention relates to a device for automatically controlling a commercial washer, such as is used in commercial laundries, through the several steps of operation required in removing the soil from garments and particularly to a device which permits the operator to select at will the several elements of the formulae employed in the various washing steps.

Many automatic controls have been developed and are in current use on household washers but in household washers the program is usually a fixed program with a single suds operation followed by one or more rinses. Commercial washer controls must meet a much wider variation in the condition of the garments being laundered, such as the degree of soil and the texture of the various types of fabrics. Further, an established degree of whiteness must be maintained. Also, since a commercial laundry must operate economically, the number of suds baths and the number of rinses must be adjusted to the particular load being processed.

To further conserve supplies, the amount of detergent added should be automatically determined, the temperature of the water should be controlled, and the depth of the pool in the bottom of the washer should be adjustable and this adjustment must be different for washing and rinsing.

With the wide range of soiled garments reaching a laundry, it is desirable to collect garments of similar kind and soil, and to use on each the appropriate sequence of steps.

In attempting to provide some flexibility in the program, various controls have been provided with a series of program rolls or discs, each roll or disc being designed to cause the washer to follow a particular formula or sequence of steps. While this gives some flexibility, it does not permit the washman to use his own judgment nor to change formula with facility. It does not necessarily follow that because the number of suds is increased for several dirty loads, that the length of time that they are to be agitated or the number of rinses are increased to the same degree for both loads.

Controls sometimes will become disabled and because a commercial washer represents a large investment and is permanently attached to the supply line, it is essential that the washer be operable even though the automatic control is not used.

One of the objects of the invention is to provide a control to enable the washman to set up the values he desires for the various elements that enter into a washing process, then load the machine with garments, start the machine off and leave it to the automatic control to carry the operation through all of the steps, the automatic control remaining set so that the washman need not reset it for a suceeding load unless the condition of operation changes.

A further object of the invention is to provide a control arrangement for a washing machine which is operable semi-automatically through a single step of the washing process, dumping the bath at the proper time, and which also is operable fully automatically monitoring the semi-automatic means so as to carry out the entire washing operation.

A further object of the invention is to provide an arrangement wherein the automatic portion of the control can be mounted in a housing which can readily be removed from the semi-automatic portion and which can then be operated independently of the fully automatic portion that has been removed.

A further object of the invention is to provide an adjustable washer control which will indicate temperature and depth of water and will automatically terminate the operation at the end of a selected time and drain the washer.

A further object of the invention is to provide a fully automatic washer control adjustable to select the depth of water for washing and rinsing and which will agitate the clothes for a preset time following the controlled feeding of water and washing supplies to the washer.

The control of the invention is useable with any washing machine but is especially adapted for use with a conventional horizontal shell type of commercial washer. Such a washer has a rotatable cylinder, supply feeding means, and means for draining the shell following an operation.

In one aspect of the invention the automatic control means can be arranged so that it can be adjustably settable to select various elements or steps of the formula to be used in washing the load involved, such as:

The quantity of water for each suds operation,
The amount of soap to be added to said quantity,
The temperature of said water,
The length of time the clothes are agitated in a suds operation,
The number of suds operations,
The amount of water to be used in a rinse bath,
The length of time the clothes are agitated in the rinse bath,
The number of rinses and kind.

In one form of the invention, a semi-automatic control means can be provided which is adjustably settable to control the level of the bath in the washing machine at a first level during the sudsing operation and a second and different level during the rinsing operation. A temperature control device can be incorporated therewith. A second control device is employed to operate in conjunction with said first control means to control the number of the sudsing and rinsing operations, the level of the baths being controlled by the first control device. A suds level responsive device can be used to control the supply of soap for sudsing operations. The control means also can have readily settable means for selecting the number of sudsing operations and the number of rinses and succeeding operations. In a preferred form, the control may include a plurality of levers settable to the depth of water desired for sudsing and for rinsing and other operations, said levers also serving as indicators. The automatic control arrangement can have pairs of levers which are manually settable to provide the desired number of suds operations and the total number of operations.

These and other objects, advantages and features of the invention will become apparent from the following description and drawings, which are merely exemplary.

Figure 4:
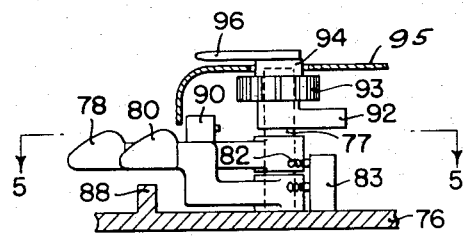
Figure 3:
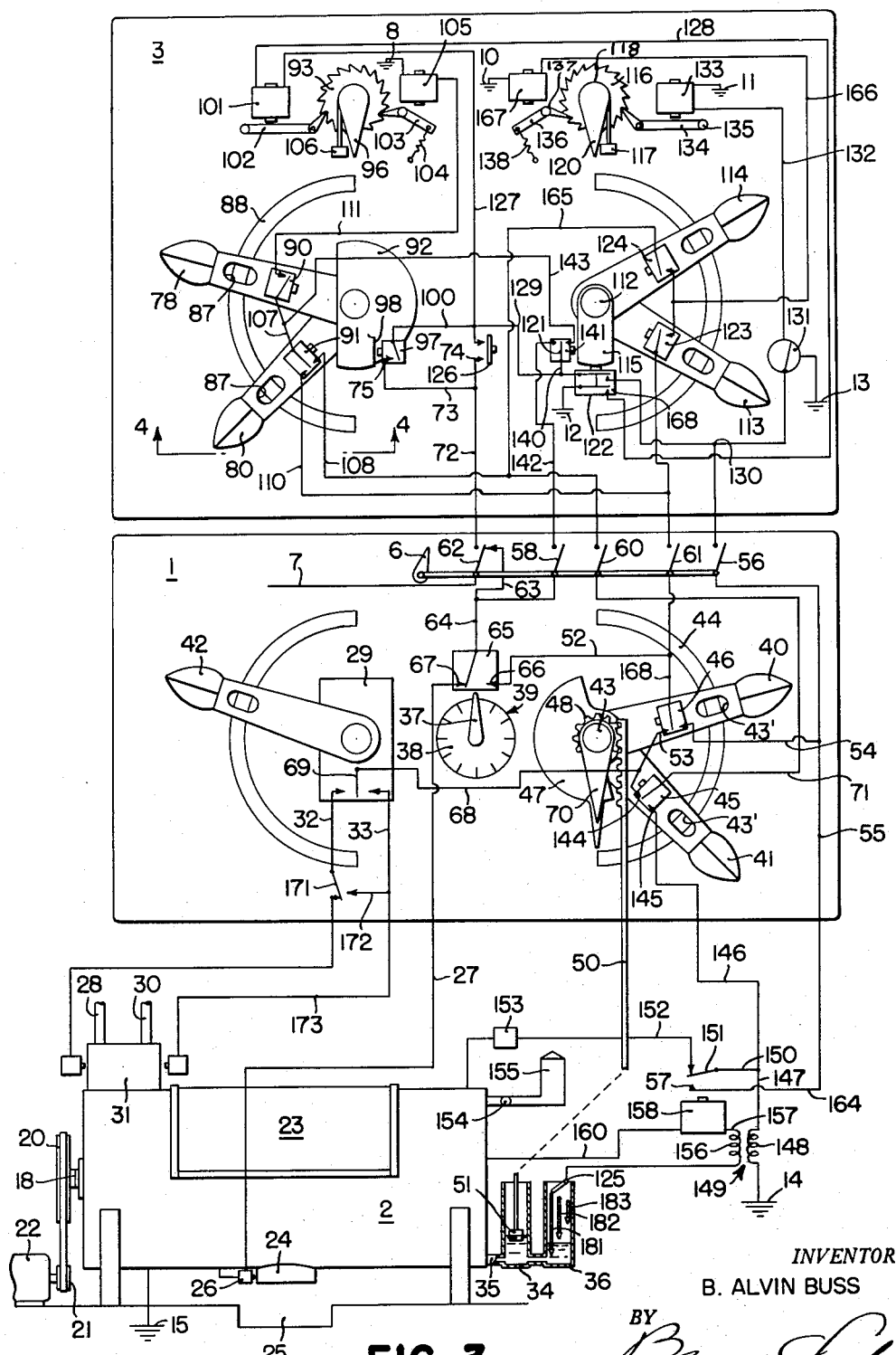
Fig. 3 shows in diagrammatic form the circuits and the relationship of the various parts of both the fully automatic and the semi-automatic controls to the washer.

Fig. 4, taken along line 4—4 of Fig. 3, shows the operation number selecting mechanism.

Figure 5:
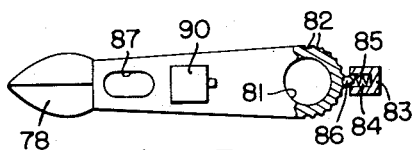

Fig. 5, taken along line 5—5 in Fig. 4, shows a plan view of handle 78.

Figure 6:
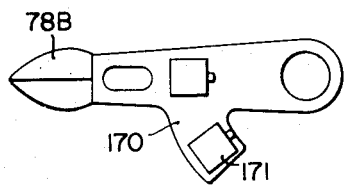

Fig. 6 is a modified form of the handle shown in Fig. 5.

Figure 1:
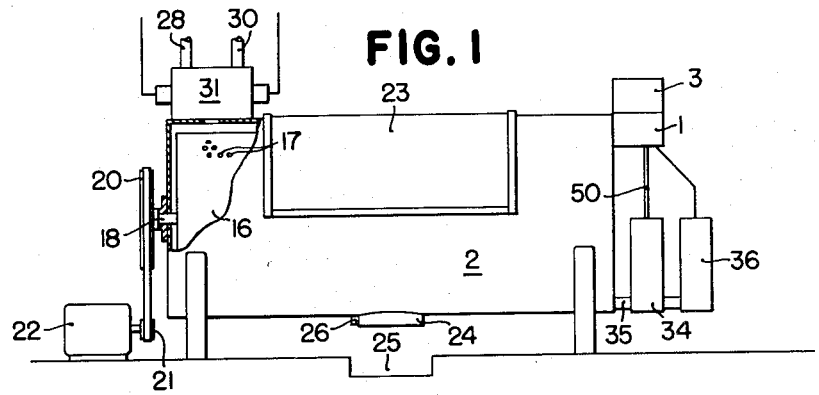
Fig. 1 shows a commercial washer in elevation, partly in section, the washer being equipped with a semi-automatic and a fully automatic control.
Figure 2:
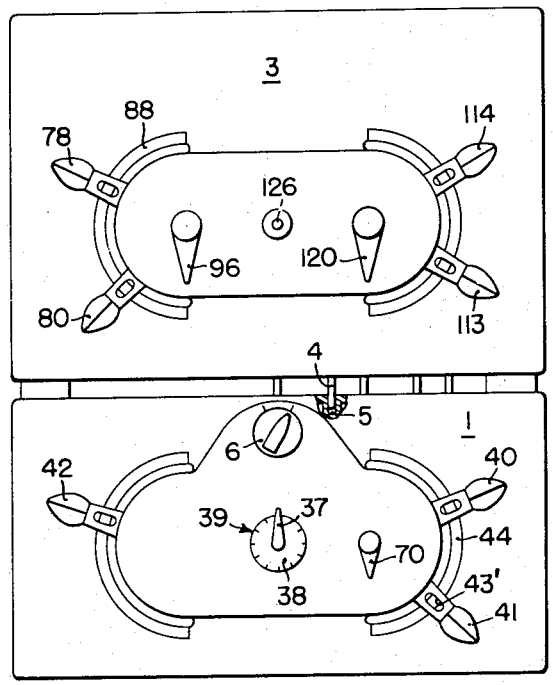
Fig. 2 shows the semi-automatic and the fully automatic controls, in elevation to a larger scale.

The invention comprises a semi-automatic control 1 adapted to be connected to a washer 2 and a fully automatic control 3 adapted to be removably connected to the semi-automatic control. Referring to Fig. 3 the lower portion of the drawing refers to the circuits in the semi-automatic control 1 while the upper part of the drawing refers to the circuits in the fully automatic control. Preferably the various circuits in the control 3 end in pins 4 which fall into sockets 5 on control 1, as shown in Fig. 2. A master switch 6 is arranged to disconnect all of the circuits leading from the control 3 to control 1. Although an apparatus such as this is customarily actuated by A. C. 110 or 220 volt current, to avoid confusion the current has been shown as if applied through a single feeder 7 and, after it passes through the apparatus actuated, terminates in a series of grounds 8, 10, 11, 12, 13, 14 and 15.

The washer 2, on which these controls are mounted, may have the usual horizontal shell. Inside of this shell is the horizontal cylinder 16 provided with perforations 17. This is supported on a horizontal axis 18 carrying the pulley 20 which may be driven from the pulley 21 carried by the driving motor 22. The shell 2 may have the usual door 23 through which the clothes are loaded into the shell 16 and a dump valve 24. This dump valve permits the soiled water to be drained off into a gutter 25

This dump valve may be of the type shown in the patent granted to A. H. Davis, No. 2,433,816 on June 22, 1948. The dump valves closes automatically when the washer is to be filled and is opened when the solenoid operated pilot valve 26, which is connected with line 27, is activated.

The washer 2 is filled with hot water from line 28 or cold water from line 30 through the combined mixing and shut-off valve 31. This valve may be of the type shown in Patent No. 2,479,177 granted to E. L. Miller on August 16, 1949. Lines 32 and 33 connect the two solenoid operated pilot valves which control the admission of hot and cold water to the washer to the semi-automatic control described below.

A well 34 may be connected to this washer through pipe 35 and this well provides a means for controlling the water level in the washer. When the washer is used in a full automatic manner a second well 36 is provided to control the supply of soap.

The semi-automatic control will be described first:

On the face of the semi-automatic control housing is a knob 37 of timer 39 which can be manually turned to indicate on the dial 38 the number of minutes the one operation is to continue. This housing also has two levers 40 and 41 which permit selecting the depth of water desired and a lever 42 which permits selecting the temperature of the bath desired.

This semi-automatic control is of the general type shown in Patent No. 2,520,797 granted on August 29, 1950, to myself and H. W. Miller. The object of this semi-automatic control is to permit the operator to select the depth of the bath in the washer, the temperature he wishes to use, and the length of time which he wishes the clothes to be agitated. As the operator walks away the automatic control is automatically opening the hot and cold water valves alternately until the washer is filled to the desired level with water at the desired temperature.

In operating on the semi-automatic basis, the operator uses only lever 40. The knob 37 is the knob of the familiar spring actuated timer in which the spring is wound as the knob 37 is turned to the number of minutes which the machine is to operate. During this length of time this timer is running down, the washer cylinder will be revolved causing the clothes to tumble in a pool of water. At the end of the time for which the timer was set it will close a switch that opens the dump valve and allows the liquid to drain out. The machine is now ready for the operator to reset the machine for the next step of the process.

Mounted on the stationary stud 43 are the manually adjustable levers 40 and 41. These levers are arranged to hold any position the operator selects. This may be accomplished in any desired manner, by way of illustration in the manner shown, in connection with levers 80 and 78 to be described subsequently in connection with the fully automatic control. Each of levers 40 and 41 may have an opening 43' which permits the operator to set the lever on the scale 44 which is calibrated to indicate the quantity of water in the cylinder. This may show either the depth of water or the number of gallons corresponding to the given depth. The lever 41 carries a micro switch 45 and lever 40 carries a micro switch 46. Also freely movable on the stud 43 is a cam 47 carrying a pinion 48. The pinion 48 is moved by a rack 50. This rack is connected to a float 51 in the well 34. As the water level rises in the washer the float 51 moves the rack 50 upwards and this turns the cam 47. When this cam, responsive to the water level in the washer engages the button of switch 46, the current flowing from 52 through 53 to the thermostatic control 29 is cut off and the line 52 is now connected to lines 54, 55 which end in open switch 56 and open contact 57.

We will now describe the operation of the semi-automatic control 1 when used to operate one step of the washing process. When master switch 6 is in the position shown, the switches 58, 60, 61 and 56 which are connected to sockets 5, are open and switch 62 is in the position shown to connect main supply line 7 to line 63. Current now flows through lines 7 and 64 to micro switch 65 which contacts 66 when timer 39 is wound up but which contacts 67 when the timer is not wound up. Timer 39 is one of the customary clockwork timers which indicate the number of minutes the operation is to continue by means of knob 37.

When the timer runs the length of time it has been set, contact 67 is closed and current flows through line 64, switch 65, contact 67, line 27 to the solenoid actuated pilot valve 26 which opens the dump valve 24 and the washer is drained.

When the operator turns knob 37 clockwise, contact 66 is made, the dump is closed and current now flows through 7, 62, 63, 64, 65, 66, line 52 to switch 46 on lever 40. This switch normally closes the circuit to contact 53 which connects lines 68 to the thermostatic control 29 which may be adjusted in the manner shown in Patent No. 2,502,797 to shift the movable contact 69 from line 32 to line 33 or vice versa as the temperature in the bath changes. Lines 32 and 33 control the solenoid pilot valves in the mixing valve 31 described in a patent to E. L. Miller No. 2,497,177, to admit hot or cold water from lines 28 or 30.

Thus, the hot and cold water valves open as required to maintain the selected temperature in the rinsing bath and the float keeps moving upward until the pointer 70 on cam 47 indicates the level of the bath which showed in the window 43' of lever 40 as set by the operator. Simultaneously cam 47 reaches switch 46 and the water supply is cut off. The washer continues to revolve, tumbling the clothes in the bath.

The automatic clockwork timer will ultimately return to zero and when this happens, the current through contact 66 is interrupted and the flow of current to line 27 is established and the machine dumps. The operator will now reservice the machine and reset the knob 37 for the next step.

The cam 47 in passing on to switch 46 as described, also actuated the micro switch 45 but the washing process was in no way affected by it because the line 71 connected with the open switch 60 carries no current. The lever 40 is thus used to control the operation, regardless of whether the operator adds a detergent or not.

When the device is operated as a fully automatic control, lever 40 controls the depth of the pool in rinsing and lever 41 controls the depth of the pool in suds operation in the manner to be described.

*Fully automatic control*

When the control is to be operated as fully automatic, the control box 3 is mounted on top of the semi-automatic control 1 as shown in Fig. 2. The master switch 6 is then closed and current now flows from line 7, switch 62, lines 72, 73 to the open contacts 74, 75.

In the automatic control the successive steps are selected by the two levers of the type shown in Fig. 4. Attached to a base 76 is a stationary stud 77. Free to turn on this stud is the lever 78. This lever, top view shown in Fig. 5, may have a bore 81 which fits over the stud 77 and may have a series of recesses 82. Adjacent to the stud 77 is the post 83 and this post contains a hole 84 in which are a compression spring 85 and a ball 86. When the lever 78 is moved the ball 86 will be pushed into one of the recesses by the spring and thus lever 78 will be retained in the manually selected position. This lever has an opening 87 through which the numbers on the scale 88 are visible, showing the position of the lever. Thus, in the position shown, the lever calls for seven total steps. This lever carries the micro switch 90.

Another lever 80, similar to the lever just described, is also free to turn on the stud 77 and this also will hold its selected position when the ball 86 is pushed into the recess 82. The lever 80 also has an opening 87 through which its position on the scale may be read to show the number of suds steps the operator wishes to make on this load of fabrics. This lever carries a micro switch 91. The two levers 80, 78 are on the same plane. Also free to turn on the same stud 77 is a cam 92. This cam 92 and a ratchet disc 93, attached to each other, also carry a sleeve 94 which projects out through the cover plate 95. This sleeve 94 carries pointer 96. This pointer shows on the scale 88 the step of the process the washer is currently performing. As the ratchet disc 93 is moved, the cam is moved and this cam engages the buttons which actuate the switches 90 and 91. To maintain the circuit after the operator has pushed the starting switch 126 another micro switch 97 is provided. This is so placed in relationship to the cam 92 that when the cam is in the position it occupies when the washer is to start, shoulder 98 of cam 92 causes a circuit from 73 to 100 through the micro switch 97 to be interrupted, but when the cam moves on to any of the positions beyond zero, the circuit is closed which by-passes the starter button 126.

Although the cam 92 and the ratchet disc are joined together as shown in Fig. 4, they are shown separately in Fig. 3 for greater clarity. The same method of presentation will be used in connection with cam 115 and ratchet disc 116 to be described below.

When the cam 92 is in the off position shown, the switch 97 is engaged which opens the contact 75, and thus prevents current from flowing to line 100. The ratchet disc 93 is adapted to be moved forward a step at a time by a solenoid 101, which attracts an armature carried by the arm 102. The ratchet disc is prevented from turning backward by a pawl 103 normally held in place by a spring 104 anchored to the housing. A solenoid 105 when actuated, is adapted to overcome this spring, release the ratchet disc and allow the weight 106 to turn the ratchet disc back until the cam shoulder 98 hits the switch 97. Lever 80 carries the micro switch 91 which is normally connecting line 107 with 108. This micro switch may be adapted to engage the cam 92 carried by the stud 77 and when so engaged breaks the contact to line 108 and establishes a contact to line 110. Lever 78 carries a switch 90 which normally opens contact with 111 but will make contact when the cam 92 engages the micro switch 90. The switch 90 is connected by line 111 with solenoid 105 and the solenoid in turn is connected to ground 8.

The control housing 3 also carries a stud 112 about which swing two adjustable levers 114 and 113 which permits the operator to select the length of time he wants his washing and his rinsing step respectively to continue. Levers 113 and 114 are mounted on stud 112 very much as 78 and 80 are mounted on their stud 77. These levers are held in the position the operator selects in the same manner as 78 and 80 were held. Also free to turn on the stud 112 is a cam 115 connected to a ratchet disc 116. Both are biased to turn in one direction such as by a weight 117 suspended from a strip extending around collar 118 carried by the ratchet disc. Pointer 120 is mounted similarly to pointer 96 to indicate the time elapsed on the particular step in progress. Cam 115 comes to a stop against switch 141. The casing carries a double pole switch 122 which is closed by cam 115 before the timing of the operation starts.

Lever arm 113 carries the micro switch 123 which is normally open but is closed when cam 115 engages the switch. Lever 114 carries the micro switch 124 which is also normally open but closed by cam 115.

To detect the depth of suds the washer is provided with the well 36. Mounted inside of this well, but insulated therefrom, are the three electrodes 181, 182, 183 projecting downward to different depths. A switch 125 permits connecting any one of the desired electrodes into the circuit of the automatic control.

We will now describe the operation of the fully automatic control.

To start, the operator first sets the lever 80 to indicate the number of suds operations he wants, and the lever 78 to indicate the total number of steps he wants, including the suds, and the lever 114 to indicate the number of minutes he wishes each suds operation to continue, the lever 113 to indicate the number of minutes he wishes each rinse operation to run, the lever 40 to indicate the level of the water he wishes to use in rinsing, the lever 41 to indicate the water level in washing, the switch 125 to indicate the depth of suds he wishes and the lever 42 to indicate the temperature of the water at which he wishes to operate.

Having made these selections, the operator is ready to start and pushes and closes the starting switch 126 which is normally open. The immediate result will be that current flows from 72, switch 126 into lines 127 and 128. Line 127 leading to solenoid 101 and thence through line 128 to the switch 122 and thence to ground 12, causes the arm 102 to move the ratchet disc 93 one step to enable the pointer 96 to indicate the step in progress on the scale 88. Step one is now in progress. Switch contact 75 is now closed since cam 92 has moved and the starting switch 126 need not be held closed. Current now flows through 129 through switch 122, line 130, timer 131 to line 132, solenoid 133 and thence to ground 11.

Solenoid 133 attracts its arm 134 pivoted at 135 and this moves the ratchet disc 116 one step ahead. A pawl 136 pivoted at 137 is drawn by a spring 138 into contact with the ratchet disc and thus, once the ratchet disc has been stepped forward, prevents its return. Current will flow from the source of power 7, switch 62, line 72, 73, switch 97, lines 100, 129, 140 to the switch 141 and thence through line 142 and switch 58, line 64, switch 65, line 27 to the solenoid actuated pilot valve 26 which opens the dump valve 24, and thence to ground 15. When the solenoid 133 has stepped the ratchet disc 116 one step forward the cam 115 will also move and switch 141 will change and current will no longer flow through line 142 to thereby cause closure of the dump valve 24; but instead will flow through line 143 to the levers 78 and 80 which select the number of operations. Current now flows from 143 through 107, switch 91, line 108, switch 60, line 71, switch 45, contact 144, to line 68 which leads to the thermostatic control switch 29. This thermostatic control switch in a manner already described, will actuate the mixing and shut-off valve 31 and start to fill up the washer cylinder. As the water level rises in the cylinder and in the well 34, the rack 50 will rise in the manner previously described and the cam 47 will engage switch 45 switching the circuit from 144 to 145, when the level selected is reached.

The cam 47 carries a pointer 70 which rides over the scale 44 and shows the level of water at any particular instant.

When the contact 144 is broken and the contact 145 is made, there is no more current flowing to the thermostatic control switch 29 and the current is now diverted to line 146. This line supplies current to line 147 and the primary 148 of a transformer 149 to the ground 14.

Current is also supplied to line 150, to a switch arm 151 which carries the current to line 152, which leads to the solenoid 153 which opens the valve 154 in the line leading from the soap tank 155 to the washer. As the soap mixes with the water being agitated in the washer, suds form and these suds elevate the level not only in the shell but also in the well 36. The secondary 156 of the transformer 149 generates a high voltage current. One side of this secondary leads to line 157, solenoid 158, line 160 which is grounded on the washer 2. The other side of the secondary 156 is connected with the three position switch 125 which is adapted to be connected manually with any one of the three electrodes 181, 182, 183. These electrodes extend to different elevations and when the suds level rises to touch the correct electrode the circuit is completed through the secondary 156 and solenoid 158 which pulls switch arm 151 to cut the flow of current from line 150 off line 152 that leads to the soap supply and instead feeds the current to lines 164, 55, switch 56 to line 130, which leads to the timer 131. Current flows through the motor driving this electric timer and thence to a ground. Once a minute a circuit is closed for a short space of time by this timer, and this sends current through the solenoid 133 at one minute intervals. Thus, at fixed intervals the ratchet disc 116 and the cam 115 advance until it engages switch 123, carried on lever 113.

As this switch is not connected because contact to line 110 in the switch on handle 80 is open, the cam will pass the switch and proceed on to switch 124 carried by lever 114. This normally open switch draws current from line 108 through line 165 and when it is closed by the cam 115, feeds current to line 166, to the solenoid 167. The solenoid attracts its arm 134 and removes the pawl 136 from the ratchet disc 116 which allows the weight 117 to carry the ratchet disc back to its initial position in which the cam 115 engages switch 141. The switch 141 thus actuated cuts off current from line 143 supplying it to line 142 which again opens the dump valve through line 27.

As the cam returns to its initial position, it engages both switch 141 and switch 122. In engaging switch 141 current is again supplied in the manner already described from line 140 to line 142 which finally connects with the solenoid actuated pilot valve 26 that opens the dump valve 24. When switch 122 is closed, current is allowed to flow from line 129 through 122, and 130 to the timer 131. In this way the timer is kept in operation during the dump period although the previous source of power has been lost by the opening of contact 57. After the lapse of one minute which is sufficient time for the contents of the water in the washer to drain out through the dump valve 24, the timer sends current through line 132 to the solenoid 133 which steps the ratchet disc 116 forward one step. This moves the cam 115 away from switches 141 and 122 and the dump valve now closes and the current through the timer is interrupted. The pointer 120 attached to the cam 115 now pauses until the water level and suds level have again built up and will again close the contact 57 in the manner previously described, and provide the current through 55 and switch 56 to actuate the timer 131. This then moves the cam 115 counterclockwise and the pointer 120 will indicate on the scale the number of minutes that have elapsed. When the pointer and the cam have again moved up to switch 124 the same restoration of the position of the cam 115 takes place.

In this manner the fully automatic control box 3 monitors the semi-automatic control in box 1 to complete one operation after the other of the washing process.

In this way it is also assured that each batch will be agitated the allotted time regardless of variations in the rate in which the washer fills up.

When the cam 115 returns to its initial position and closes the double pole switch 122 it also closes the contact 168 allowing current to flow from line 129 through line 127, solenoid 101, line 128, switch 122, and ground 12. This attracts arm 102 and moves the ratchet disc 93 one further point ahead. In this manner the cam 92 is advanced one step as indicated by the pointer 96 at the completion of each suds step.

When the number of suds selected by the operator in the setting of the lever 80 have been completed, the cam 92 engages the micro switch 91 and the current flowing into line 143 is now led to line 110 rather than line 108, and switch 61, line 168 to the switch 46. In the position shown this feeds current to line 53, line 68, to the thermostatic control 29 which again fills the washer. However, as the float 51 rises and the cam 47 engages the switch 45 nothing happens because there is no current flowing through that switch and thus the water level will continue to rise until the higher lever desired for rinsing is reached. Whereas before, the closing of the micro switch by the cam 47 shifted the flow of current from the water inlet valve to the soap valve it now shifts the current from contact 53, feeding current to line 54 which connects with 55 and switch 56 with the timer 131.

When cam 115 reaches micro switch 123, the switch is closed, sending current to solenoid 167 releasing ratchet 116, causing cam 115 to return to its original position and change switch 141 to dump rinse water. Cam 115 also causes the switch 122 to energized solenoid 101 as at the end of the suds operation moving ratchet 93 one step. Thus, the device continues to move the ratchet disc 93 and the cam 92 one step at the end of each rinse until the cam 92 engages the switch 90 and this sends current to 111 through the solenoid 105. This attracts the pawl 103 overcoming the force of the spring 104 and releases the ratchet disc 93 and allows the weight 106 to reset the ratchet with the shoulder 98 bearing against the switch 97.

This allows the cam 92 to go back to its initial position which opens switch 97 thus cutting off current to the entire automatic control and bringing the operation to an end.

The description of the operation of the fully automatic control, has, for simplicity, performed all of the steps with hot water. In the modification illustrated in Fig. 6 some of the last rinses may be cold water rinses. This is particularly desirable since it is customary to apply blue and sour in cold water and since it is desired to have the clothes cool to handle when the washer stops. In order to effect this, the lever 78B is substituted for lever 78. This lever is similar to the lever shown in Fig. 5 except that it has a lateral extension 170 which carries another switch 171. This switch is shown in Fig. 3 as inserted in line 32 leading to the hot water controlling pilot solenoid valve. When the switch is actuated, current from 32 is diverted through line 172 to line 173 leading to the cold water pilot solenoid valve. In this way, regardless of the position of the thermostatic control, the last one or two rinses are made cold rinses. The cam 92 will engage the switch 171 the number of required steps before it engages 90 determining the operations which are determined by the spacing of switches 171 and 90.

What I claim is:

1. In a commercial washer, for washing a load of laundry or the like, in combination, a source of electric energy, a first control device comprising manually adjustable automatic means for controlling the level of the bath in the washer at a first level for sudsing the load, manually adjustable automatic means for controlling the level of the bath at a second level for rinsing said load, and a second control device comprising manually adjustable automatic means for controlling the number of the sudsing and rinsing operations controlled as to the levels of the baths by said first control device, said second control device including two biased movable means, an electric relay coordinated to each of said two movable means for causing movement of the coordinated movable means stepwise in one direction, a restraining element coordinated to each of said two movable means for normally preventing the latter from moving in the opposite direction, a second electric relay coordinated to each of said two movable means for inactivating its coordinated restraining element, two switch operating members each mechanically connected with one of said two movable means to participate in the movement thereof, electric switches, some of them operable by the one and others operable by the other of said two switch operating members, said electric relays being electrically so connected to said switches that that restraining element which normally prevents return movement of the one of said two movable means becomes inactivated each time the coordinated switch operating member operates one of the switches operable thereby so as to permit return of that movable means to its initial position under its bias and causing at the same time the other of said two movable means to advance one step, whereby the restraining element which normally prevents return movement of said other of said two movable means becomes inactivated after a selected number of returns to its initial position of said one of said two movable means.

2. In a commercial washer, for washing a load of laundry or the like, in combination, a source of electric energy, a cold liquid supply line and a hot liquid supply line connected to said washer for establishing a bath therein, an electrically operable valve in each of said liquid supply lines, a first control device comprising manually adjustable automatic means for controlling the level of the bath in the washer at a first level for sudsing the load, manually adjustable automatic means for controlling the level of the bath at a second level for rinsing said load and a manually adjustable automatic thermal control for controlling the temperature of said baths including means for opening and closing said valves in said liquid supply lines in response to changes in the temperature of said bath, and a second control device comprising manually adjustable automatic means for controlling the number of the sudsing and rinising operations controlled as to level and temperature of the baths by said first control device, said second control device including two biased movable means, an electric relay coordinated to each of said two movable means for causing movement of the coordinated movable means stepwise in one direction, a restraining element coordinated to each of said two movable means for normally preventing the latter from moving in the opposite direction, a second electric relay coordinated to each of said two movable means for inactivating its coordinated restraining element, two switch operating members each mechanically connected with one of said two movable means to participate in the movement thereof, electric switches, some of them operable by the one and others operable by the other of said two switch operating members, said electric relays being electrically so connected to said switches that that restraining element which normally prevents return movement of the one of said two movable means becomes inactivated each time the coordinated switch operating member operates one of the switches operable thereby so as to permit return of that movable means to its initial position under its bias and causing at the same time the other of said two movable means to advance one step, whereas the restraining element which normally prevents return movement of said other of said two movable means becomes inactivated upon the operation of one of said switches by said other of said two switch operating members after a plurality of returns to its initial position of said one of said two movable means, said last named switch being preceded in the direction of the forward movement of its coordinated switch operating member by an auxiliary switch electrically interposed into the electrical connection between said thermal control and said valves in said cold and hot liquid supply lines in such a manner that upon operation of said auxiliary switch the valve in the cold water supply line is kept effective regardless of the position of said thermal control.

3. A commercial washer for washing a load of laundry or the like, and having means for agitating the load to be cleansed and a dump valve, comprising, in combination, a first control device comprising manually adjustable automatic means for controlling the level of the bath in the washer at a first level for sudsing the load, manually adjustable automatic means for controlling the level of the bath at a second level for rinsing said load, an adjustable timer for controlling the length of time of agitation of the load during either sudsing or rinsing and means for opening said dump valve at the end of each such period of agitation of the load for either sudsing or rinsing, parts of said first control device being enclosed in a casing rigidly secured to the washer and carrying a number of one of the two elements of a plug and socket connection, electric circuits controllable together as an independent unit by said first control device and having electric extensions to said number of one of the two elements of a plug and socket connection, a second control device comprising manually adjustable automatic means for controlling the number of the sudsing operations and manually adjustable automatic means for controlling the number of the rinsing operations, said second control device carrying a number of the other of said two elements of said plug and socket connection, electric circuits controlled by said second control device and terminating in the last named elements, so that said second control device is readily attachable to and detachable from said first control device by plugging said plugs carried by one of said two control devices into or out of, respectively, the sockets carried by the other of said two control devices and, when so attached to said first control device, said first and said second control devices are mutually monitoring each other.

4. A commercial washer as defined by claim 3, wherein one of said two control devices comprises a master switch arranged so as to electrically connect, when in one position, the electric circuits of the second control device with the circuits of the first control device for fully automatic washing control interaction of said two control devices and, when in another position, to separate the electric circuits of the second control device from the circuits of the first control device but leaving the latter circuits complete for semi automatic washing control operation independently of the circuits of said second control device.

5. In combination, a container, two liquid supply lines connected to said container for establishing a bath therein, means for controlling the temperature of the bath established in said container by the liquid supply through said two liquid supply lines, a first manually adjustable automatic means for shutting off said liquid supply to said container upon the level of said bath in said container reaching a first selected height, means for agitating said bath, a second manually adjustable automatic means for shutting off said liquid supply to said container upon the level of said bath in said container reaching a second selected height, a detergent supply line connected to said container, means for controlling the admission of detergent through said detergent supply line to said container so as to admit detergent to the container upon actuation of said first automatic means but to prevent admission of detergent to the container upon actuation of said second automatic means, a third manually adjustable automatic means for terminating the admission of detergent upon the suds forming in said container due to agitation of the detergent containing bath reaching a third selected height, a fourth manually adjustable automatic means for controlling the time of agitation of said bath when containing detergent, a fifth manually adjustable automatic means for controlling the time of agitation of said bath when not containing detergent, means for draining said container each time the bath in said container has been agitated for the length of time selected by either said fourth or said fifth automatic means, common movable means for actuating in succession said first and said second automatic means, common movable means for actuating in succession said fourth and said fifth automatic means, a sixth manually adjustable automatic means for causing repetition of the sequence of steps controlled by said first, third and fourth automatic means and by said means for draining said container for a selected number of times, a seventh manually adjustable automatic means for causing repetition of the sequence of steps controlled by said second and fifth automatic means and by said means for draining said container for a selected number of times, common movable means for actuating in succession said sixth and said seventh automatic means, means for returning to its initial position said common movable means for actuating said fourth and said fifth automatic means each time this movable means actuates either said fourth or said fifth automatic means, means for keeping said detergent supply line permanently closed for the remainder of the cycle of operations to be controlled by said seventh automatic means upon said common movable means for actuating said sixth and said seventh automatic means having actuated said sixth automatic means, and means for returning to its initial position said common movable means for actuating said sixth and said seventh automatic means after having actuated said seventh automatic means.

6. In combination, a source of electric energy, a container, a cold liquid supply line and a hot liquid supply line connected to said container for establishing a bath therein, an electrically operable valve in each of said two liquid supply lines, means for controlling the temperature of the bath established in said container by the liquid supply through said two liquid supply lines adapted to close said valve in said hot liquid supply line when the temperature of said bath is above a selected temperature and to close said valve in said cold liquid supply line when the temperature of said bath is below said selected temperature, a first manually adjustable automatic means for shutting off said liquid supply to said container upon the level of said bath in said container reaching a first selected height, means for agitating said bath, a second manually adjustable automatic means for shutting off said liquid supply to said container upon the level of said bath in said container reaching a second selected height, a detergent supply line connected to said container, means for controlling the admission of detergent through said detergent supply line to said container so as to admit detergent to the container upon actuation of said first automatic means but to prevent admission of detergent to the container upon actuation of said second automatic means, a third manually adjustable automatic means for terminating the admission of detergent upon the suds forming in said container due to agitation of the detergent containing bath reaching a third selected height, a fourth manually adjustable automatic means for controlling the time of agitation of said bath when containing detergent, a fifth manually adjustable automatic means for controlling the time of agitation of said bath when not containing detergent, means for draining said container each time the bath in said container has been agitated for the length of time selected by either said fourth or said fifth automatic means, common movable means for actuating in succession said first and said second automatic means, common movable means for actuating in succession said fourth and said fifth automatic means, a sixth manually adjustable automatic means for causing repetition of the sequence of steps controlled by said temperature controlling means, said first, third and fourth automatic means and by said means for draining said container for a selected number of times, a seventh manually adjustable automatic means for causing repetition of the sequence of steps controlled by said temperature controlling means, said second and fifth automatic means and by said means for draining said container for a selected number of times, common movable means for actuating in succession said sixth and said seventh automatic means, means for returning to its initial position said common movable means for actuating said fourth and said fifth automatic means each time this movable means actuates either said fourth or said fifth automatic means, means for keeping said detergent supply line permanently closed for the remainder of the cycle of operations to be controlled by said seventh automatic means upon said common movable means for actuating said sixth and said seventh automatic means having actuated said sixth automatic means, means placed in the path of said movable means for actuating said sixth and said seventh automatic means at a point between these two automatic means for rendering ineffective, when actuated by said last named movable means, said temperature controlling means to admit to the container other than cold liquid during the remainder of said cycle of operations, and means for returning to its initial position said common movable means for actuating said sixth and said seventh automatic means after having actuated said seventh automatic means.

7. In a washing machine for treating a load of laundry, the combination including a first control means having manually settable automatic control means thereon for controlling the level of the bath in said washing machine at a first selected level during sudsing, manually settable automatic control means thereon for controlling the level of the bath at a second level during rinsing, and second control means having manually settable automatic means thereon for controlling the number of the sudsing and rinsing operations of said load and controlled as to the level of the baths by said first means.

8. In a washing machine for treating a load of laundry, the combination including a first control means having manually settable automatic control means thereon for controlling the level of the bath in said washing machine at a first selected level during sudsing, manually settable automatic control means thereon for controlling the level of the bath at a second level during rinsing, said first control means including means controlling temperature of the bath, and second control means having manually settable automatic means thereon for controlling the number of the sudsing and rinsing operations of said load and controlled as to the temperature and level of the baths by said first means.

9. In a washing machine for washing a load of laundry, the combination comprising first control means having manually settable automatic control means thereon for controlling the level of the bath in the machine at a first selected level for sudsing operations, manually settable automatic control means thereon for controlling the level of the bath at a second level for rinsing operations, second control means comprising manually settable automatic control means thereon for causing repetition of the sudsing operation for a selected number of times and for controlling the duration of at least one of said sudsing operations, and manually settable automatic control means thereon for causing repetition of the rinsing operation for a selected number of times and for controlling the duration of at least one of said rinsing operations.

10. In a washing machine for washing a load of laundry, the combination comprising first control unit means mounted on said machine and having manually settable automatic control means thereon for controlling the level of the bath in the machine at a first selected level for sudsing operations, manually settable automatic control means thereon for controlling the level of the bath at a second level for rinsing operations, and a second control unit means separably mountable on said machine and comprising manually settable automatic control means thereon for causing repetition of the sudsing operation for a selected number of times and for controlling the duration of each of said sudsing operations, and manually settable automatic control means thereon for causing repetition of the rinsing operation for a selected number of times and for controlling the duration of each of said rinsing operations.

11. In a washing machine for washing a load of laundry, said machine having load agitating means and dump valve means, the combination including a first automatic control means having manually settable arm means thereon for controlling the level of the bath in the machine at a first level for sudsing operations, manually settable arm means thereon for controlling the level of the bath at a second level for rinsing operations, adjustable timer means controlling the length of time of agitation of the load during each of the sudsing and rinsing operations, means opening said dump valve at the end of each period of agitation of the load, arm means settable for selecting the number of sudsing operations, and arm means settable for selecting the total number of operations.

12. In a washing machine for washing a load of laundry, said machine having load agitating means and dump valve means, the combination including a first automatic control means having manually settable arm means thereon for controlling the level of the bath in the machine at a first level for sudsing operations, manually settable arm means thereon for controlling the level of the bath at a second level for rinsing operations, adjustable timer means controlling the length of time of agitation of the load during each of the sudsing and rinsing operations, said timer becoming effective to time the period of agitation after the selected level has been reached, means opening said dump valve at the end of each period of agitation of the load, arm means settable for selecting the number of sudsing operations, and arm means settable for selecting the total number of operations.

13. In a washing machine for washing a load of laundry, said machine having means for causing sudsing and rinsing operations to engage said load, temperature controllable water supply means and drain means for said machine, the combination comprising automatic control mechanism therefor having manually settable liquid level responsive selector means for selecting the level of the bath, suds level responsive means for controlling supply of soap to the bath, temperature control means controlling the temperature of the bath, settable suds timing means connected with said control mechanism for controlling the length of at least one sudsing operation, settable rinse timing means connected to said control mechanism for controlling the length of at least one rinse operation, and settable total number of operations means connected to said control mechanism for controlling the total number of suds and rinse operations.

References Cited in the file of this patent

UNITED STATES PATENTS

| | | |
|---|---|---|
| 2,328,073 | Hanney | Aug. 31, 1943 |
| 2,355,162 | Hovey | Aug. 8, 1944 |
| 2,529,334 | Ganbatz | Nov. 7, 1950 |
| 2,561,348 | Dunham | July 24, 1951 |
| 2,579,598 | Morrison | Dec. 25, 1951 |